United States Patent [19]

Moeller

[11] 4,321,891
[45] Mar. 30, 1982

[54] ADJUSTABLE ANIMAL COLLAR
[76] Inventor: Romane G. Moeller, 311 Elm Cir., Colorado Springs, Colo. 80906
[21] Appl. No.: 239,517
[22] Filed: Mar. 2, 1981

Related U.S. Application Data
[63] Continuation of Ser. No. 114,690, Jan. 23, 1980, abandoned.

[51] Int. Cl.³ .............................................. A01K 27/00
[52] U.S. Cl. .................................................. 119/106
[58] Field of Search .............................. 119/106, 109

[56] References Cited
U.S. PATENT DOCUMENTS
3,872,833 3/1975 Herbert .............................. 119/106

FOREIGN PATENT DOCUMENTS
26068 4/1931 Australia ............................. 119/106
980863 1/1965 United Kingdom ................ 119/106

Primary Examiner—Jay N. Eskovitz
Attorney, Agent, or Firm—Watson, Cole, Grindle & Watson

[57] ABSTRACT

An adjustable animal collar comprises a strap formed of an elongated strip of generally continuous material, the strap including holes therein located in spaced apart fashion along the length thereof, one end of the strap being connected to a hollow link member and the opposite end to a hollow buckle. A fastener attached to the buckle is capable of extending through any of the holes in the strap so as to prevent sliding movement of the strap as it extends through the hollow area within the buckle. The strap, proceeding from its end which is attached to the hollow link member, extends through the hollow area defined within the hollow buckle, back through the hollow area defined within the hollow link member, and finally back to its end which is attached to the hollow buckle.

8 Claims, 1 Drawing Figure

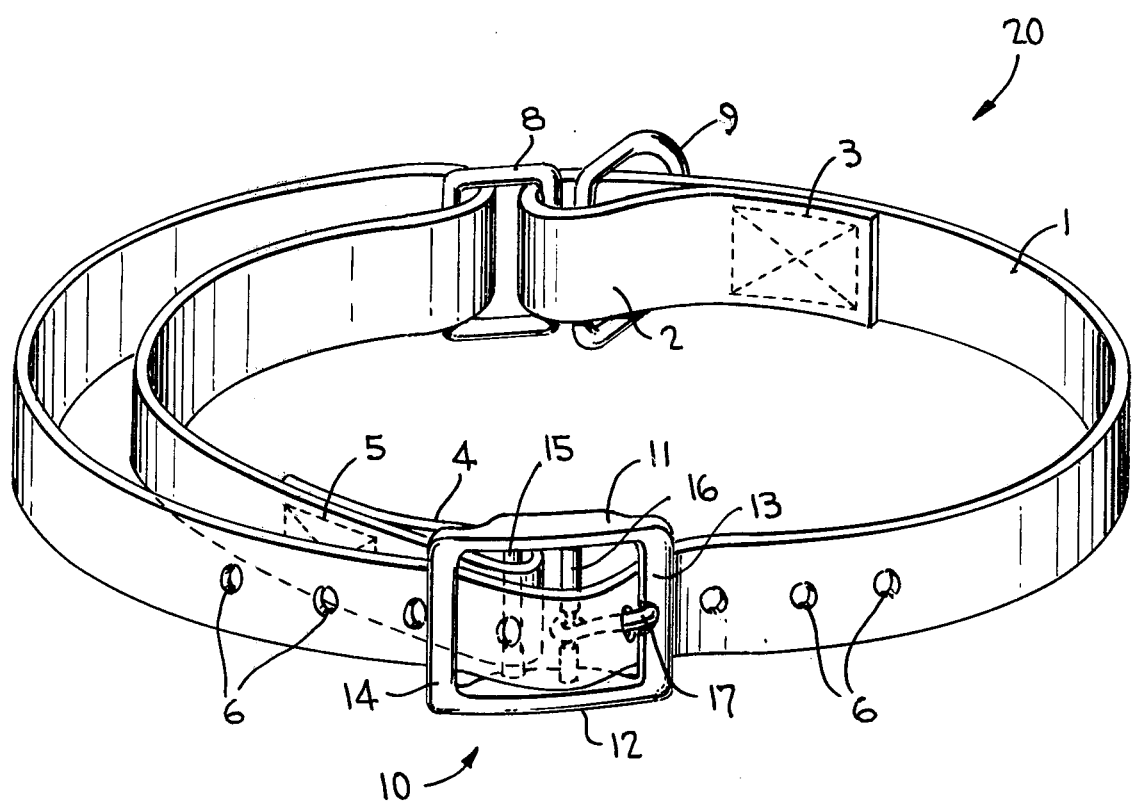

ADJUSTABLE ANIMAL COLLAR

This application is a continuation application application of application Ser. No. 114,690, filed Jan. 23, 1980, now abandoned.

BACKGROUND OF THE INVENTION

1. Field of the Invention

The present invention relates to an adjustable animal collar, and more specifically to an adjustable animal collar which can be easily adjusted to fit an animal of almost any size, which is essentially continuous in construction, i.e., it will present no freely extending or dangling end portions when properly tightened around the neck of an animal, which is durable, and which is made of both common and readily available elements.

2. The Prior Art

An adjustable dog collar is known to the art which, when snuggly positioned around the neck of the dog, will present no freely extending or dangling ends which can become caught or entangled with other objects which the dog may come in contact with, and consequently cause possible injury or death to the animal. According to Herbert, U.S. Pat. No. 3,872,833, a dog collar can be formed of a single length of a flexible link chain which can be looped around the dog's neck, the chain having an eye ring connected to one end and an end ring connected to the opposite end. The collar also includes a fastener device which is pivotally connected to the noted end ring. The collar is constructed such that the chain, as it extends from its first end connection with the eye ring to its opposite end connection with the end ring and fastener, is looped around such that an intermediate point thereof it will pass (in a slidable fashion) through the noted eye ring (thus forming a loop which can be adjusted in size to correspond with the diameter of the animal's neck), and the remainder of the chain leading up to the fastener device is extended back such that the fastener device, which itself comprises an elongated body member from which two fingers extend in a direction generally transversely away therefrom, can attach to the chain, e.g., as shown in FIG. 2. A first finger of the fastener device is capable of extending through an opening in any one of the chain links (the individual chain links each including side arms and end arms which define a uniformly sized internal rectangular opening therein), and the first finger includes a transversely extending T-head at the tip end thereof which is of such size and shape as to be capable of fitting within the longitudinal dimension of the internal opening in any one chain link, but not within the transverse dimension, such that one the T-head is inserted through the internal opening of a particular link and then aligned to extend in the transverse direction of the opening, it will be retained therein by the link side arms. The second finger of the fastener device can then be inserted into the internal opening in the chain link next adjoining the chain link in which the first finger is positioned, i.e., by a rocking movement of the elongated body member. A leash can finally be attached to the collar via a snap fastener connection with the collar eye ring.

The chain link dog collar described in the Herbert patent, however, has certain disadvantages, not the least of which is that it is somewhat awkward to adjust, since once the chain has been opened up to pass over the dog's head and then tightened so as to wrap snuggly around the dog's neck, the elongated body member of the fastener must be twisted around to an almost traverse direction with respect to an imaginary plane formed by the chain so as to enable the T-head of the first finger to fit through the longitudinal dimension of the internal opening in the appropriate link, and also since the fastener body member must then be manually rocked so as to insert the second finger in an internal opening in an adjacent link. In addition, the collar's construction and noted mode of adjustment makes painful pinching of the fingers of the person making the adjustment quite probable, i.e., during the adjustment operation, due to pinching nips created between any two adjacent links which can freely pivot with respect to one another. Also, the dog collar of Herbert is so fabricated that the T-head portion of the first finger of the fastener is obviously subjected to a significant amount of stress at times when the dog strains against the action of the connected leash, and if this metallic T-head portion should become weakened and snap away from the first finger due to stress cracking or rust, the entire collar will be made useless. Also, due to the relatively large internal openings in each of the chain links, the possibility of snagging of the collar on external objects at any point along its length becomes more possible, e.g., when the dog rubs his head and neck against an external object, such that the desired safety feature of the Herbert collar may not be entirely realized. Finally, the fastener device used in the Herbert collar is an unusual element and is not readily available in commerce, thus making the collar therein necessarily more expensive to produce and less easily repaired.

It is thus an object of the present invention to provide an improved adjustable animal collar, such as a dog collar, which is essentially continuous in construction, which is reliable and durable, which will have less of a possibility of snagging on external objects, and thus safer for use around the neck of any type of farm or domestic animal, and which is made from common and readily available elements.

SUMMARY OF THE PRESENT INVENTION

According to the present invention, the adjustable animal collar includes a flexible strap formed of an elongated strip of generally continuous material, such as fabric, plastic (e.g., nylon), leather or leather-like material, one end of the strap being fixedly attached to a portion of a hollow link member and the opposite end of the strap being fixedly attached to a part of a hollow buckle. The flexible strap is constructed to include spaced apart holes therein along the length thereof, and the hollow buckle includes a retaining finger which can act to extend through any one of the holes in the strap and thus prevent sliding of the strap with respect to the hollow buckle. Proceeding from its end connection to the hollow link member, the strap passes through the hollow area defined within the buckle (wherein the noted retaining finger is inserted through an appropriate strap hole), then back to extend (in a slidable fashion) through the hollow area defined within the hollow link member, and finally back to the buckle, to which the opposite end of the strap if fixedly attached. The specific strap hole in which the retaining finger is located will determine the size of the loop formed by the portion of the strap extending from its end connection to the hollow link member to the part thereof which extends through the hollow area defined within the hollow link member, and thus the tightness of the collar around the animal's neck.

Further aspects and features of the present invention will become evident from a review of the accompanying figure taken together with the following discussion.

DESCRIPTION OF THE DRAWING

The FIGURE depicted in the accompanying drawing shows a perspective view of a preferred embodiment of an adjustable animal collar constructed in accordance with the present invention.

DETAILED DESCRIPTION OF THE PREFERRED EMBODIMENT

The inventive animal collar, generally indicated in the drawing by the numeral 20, includes a strap 1 composed of an elongated strip of generally continuous material, which material can have any suitable width or thickness consistent with its use as an animal collar. Obviously the width and thickness dimensions of the strap, which features will be also related to the strap's strength characteristics, as well as its overall length, will be generally smaller when the collar is to be used on, e.g., a small cat, than when used on, e.g., a large and/or powerful dog.

One end of the strap 1 is shown to be looped around and fixedly attached to itself to form a loop portion 2, the attachment in the present embodiment being accomplished by a suitable stitching of the end extremity of the strap to an adjacent inner portion, e.g., by the stitching indicated within rectangular area 3. The loop portion 2 is formed so as to wrap around a segment of a hollow link member 6, which is shown to be an elongated arm of a rectangularly-shaped metallic O-ring. To create this condition, the segment of the link member can either be appropriately located against the strap before the end extremity of the strap is bent around and attached to the adjacent inner portion, i.e., so as to be enclosed within the loop portion when the loop portion is initially formed, or else the noted segment of the link member can be inserted through the loop portion after the loop portion's formation, with the link member being subsequently welded closed.

The loop portion 2 of the strap 1 is also wrapped around a metallic D-ring 9 (in a fashion similar to that discussed for the segment of link member), this D-ring functioning to allow a snap fastener portion of a leash and/or identification tag to be connected to the strap and thus the entire collar.

The opposite end extremity of the strap 1 is also looped around and fixedly attached to itself to form a loop portion 4, this attachment also being accomplished in the present embodiment by stitching of the end extremity of the strip to an adjacent inner portion, i.e., by stitching indicated within a rectangular area 5. It should be noted that conventional attachment means other than stitching can be advantageously used to connect the end extremities of the strap to the adjacent inner portions to form each of loop portions 2 or 4, such as gluing, rivets, etc., as may be desired. The loop portion 4 is shown to be formed so as to wrap around a transverse bracket 15 of a buckle, the buckle being indicated in the drawing by the numeral 10.

The generally rectangularly shaped hollow buckle 10 includes elongated side members 11, 12 and end members 13, 14, as well as a first transverse bracket 15 and a second transverse bracket 16, each of the two spaced apart transverse brackets being fixedly connected across the hollow area defined between side members 11 and 12. The second transverse bracket 16 has mounted thereon to extend transversely away therefrom a pivotable elongated retaining finger 17 which has a diameter allowing it to pass through any of the spaced apart holes 6 located generally centrally along the length of the strap 1, as well as a length which allows its free end to abut against an upper part of end member 13, this end member being the one located on the side of transverse bracket 16 opposite the side nearest transverse bracket 15.

It can be seen that the collar is fabricated such that strap 1, proceeding from its connection at loop portion 2 to a segment of the hollow link member 8, passes first under end member 13 of the buckle 10, although the hollow area defined within the buckle and over transverse brackets 16 and 15, under end member 14, then back through the hollow area defined within link member 8 (and around another segment thereof—actually around the opposite elongated arm of the rectangularly-shaped O-ring 8), and back under both end member 14 and the strap 1 to finally be connected, via loop portion 4, to the transverse bracket 15 of buckle 10.

A snug fitting of the invention collar around an animal's neck can be achieved by adjusting the strap to form its largest possible loop diameter (the loop being the portion of the strap extending from its end connection to the hollow link member 8 to the part thereof which extends through the hollow area defined within the hollow link member), then fitting the collar over the head of the animal and then around its neck, adjusting the positioning of the buckle 10 along the length of the strap until the diameter of the collar is very snuggly tightened around the animal's neck, placing finger 17 of the buckle 10 in the nearest hole 6 in strap 1, and finally expanding the diameter of the strap until finger 17 abuts against an upper part of buckle end member 13 and concurrently acts to limit further expansion of the strap loop diameter.

Since the holes 6 in strap 1 are of a relatively small size, the chances of the strap catching along any part of its length on external objects are reduced (as compared to using a link chain), and, in addition, use of a generally continuous material for the strap, as well as the specific construction of buckle 10, is such that the chance of a user's fingers being pinched when the overall diameter of the collar loop is adjusted is greatly reduced.

Although the attached drawing depicts a preferred embodiment of the present invention, it should be noted that in other useful embodiments the buckle 10 need not have two transverse brackets extending across the hollow area defined between side members 11 and 12; instead, the finger 17 could be directly attached to a single transverse bracket 15 and yet still be functionally pivotable around bracket 15, e.g., by location of a slot in the loop portion 4 of the strap 1 adjacent where retaining finger 17 would be connected to the transverse bracket 15. In yet another embodiment the retaining finger 17 need not be pivotable around the transverse bracket to which it is attached, but may be suitably shaped and fixedly connected to either the transverse bracket or the buckle end member 13. Indeed, the buckle may have an entirely different form from that shown, provided that the function thereof is retained.

The hollow link member 8 can be of any suitable shape (circular, pentagonal, etc.) as long as the loop portion 2 of the strap can be fixedly attached to one portion thereof and another portion thereof can easily slidingly pass therethrough. Also, the holes 6 in the strap can be advantageously reinforced with eyelets or other conventional tear-preventing means.

Further changes and modifications can be made to the disclosed embodiment and still be within the scope of the invention as defined in the appended claims.

I claim:

1. An adjustable animal collar which is essentially continuous in construction, durable, easy to adjust, and which displays a reduced tendency to snag on external objects, the collar comprising,
   a flexible strap formed of an elongated strip of generally continuous material,
   a rectangularly-shaped O-ring, one end of said flexible strap being fixedly attached to a segment of said O-ring,
   a one-piece hollow buckle means, the opposite end of said flexible strap being fixedly attached thereto, said buckle means including retaining means attached thereto capable of contacting said strap and preventing said strap from sliding with respect to said buckle means,
   said strap, proceeding from its end connection to said O-ring, passing through the hollow area defined within said buckle means, then back through the hollow area defined within said O-ring, and finally to its opposite end connection to said buckle means, the point along the length of said strap where said retaining means contacts said strap thereby determining the loop diameter of the strap and thus the snuggness of its fit around the neck of the animal on which it is used.

2. An adjustable animal collar in accordance with claim 1 wherein said flexible strap is formed of an elongated strip of fabric material.

3. An adjustable animal collar in accordance with claim 1 wherein said flexible strap is formed of an elongated strip of plastic.

4. An adjustable animal collar in accordance with claim 1 wherein said flexible strap is formed of an elongated strip of leather.

5. An adjustable animal collar in accordance with claim 1 wherein said retaining means of said hollow buckle means comprises a finger and wherein said strap includes holes located in spaced apart fashion along its length, said finger being positionable in any one of said holes.

6. An adjustable animal collar in accordance with claim 1 wherein said one end of said flexible strap is fixedly attached to the segment of O-ring by way of said segment passing through a first loop portion located at the said one end of said flexible strap, said first loop portion being formed by bending back the end extremity of said one end and connecting it to an adjacent inner strap portion; wherein said one-piece hollow buckle means includes at least one bracket means extending across the hollow portion thereof; and wherein said opposite end of said flexible strap is fixedly attached to said hollow buckle means by way of one of said at least one bracket means extending through a second loop portion located at the said opposite end of said flexible strap, said second loop portion being formed by bending back the end extremity of said opposite end and connecting it to an adjacent inner strap portion.

7. An adjustable animal collar in accordance with claim 5 wherein said hollow buckle means includes opposite side members and opposed end members, wherein two spaced apart bracket means extend traversely across the hollow area defined within said buckle means and between said opposite side members, said second loop portion at said opposite end of said strap being wrapped around a first of said transverse bracket means, and said finger being connected to the second of said transverse bracket means.

8. An adjustable animal collar in accordance with claim 7 wherein said finger is pivotable around said second of said transverse bracket means, and is sufficiently long to extend from said second of said transverse bracket means to abut against an upper portion of the end member of said buckle means which is located on the side of said second of said transverse bracket means opposite the side thereof nearest said first of said transverse bracket means.

* * * * *